(12) United States Patent
Mafune (10) Patent No.: US 9,676,237 B2
(45) Date of Patent: Jun. 13, 2017

(54) PNEUMATIC TIRE AND METHOD FOR MANUFACTURING SAME

(71) Applicant: SUMITOMO RUBBER INDUSTRIES, LTD., Kobe-shi, Hyogo (JP)

(72) Inventor: Toshiyuki Mafune, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 358 days.

(21) Appl. No.: 14/365,848

(22) PCT Filed: Nov. 22, 2012

(86) PCT No.: PCT/JP2012/080312
§ 371 (c)(1),
(2) Date: Jun. 16, 2014

(87) PCT Pub. No.: WO2013/108483
PCT Pub. Date: Jul. 25, 2013

(65) Prior Publication Data
US 2015/0000808 A1    Jan. 1, 2015

(30) Foreign Application Priority Data

Jan. 16, 2012 (JP) .................................. 2012-006432

(51) Int. Cl.
*B60C 11/00* (2006.01)
*B60C 19/08* (2006.01)
(Continued)

(52) U.S. Cl.
CPC ............ *B60C 19/082* (2013.04); *B29C 53/56* (2013.01); *B29D 30/60* (2013.01); *B60C 11/005* (2013.01);
(Continued)

(58) Field of Classification Search
CPC ........ B29D 30/08; B29D 30/16; B29D 30/30; B29D 30/52; B29D 30/58;
(Continued)

(56) References Cited

U.S. PATENT DOCUMENTS

2006/0096697 A1    5/2006  Miki
2008/0006356 A1    1/2008  Takahashi et al.
(Continued)

FOREIGN PATENT DOCUMENTS

EP    1 876 039 A2    1/2008
EP    1 878 593 A1    1/2008
(Continued)

OTHER PUBLICATIONS

Machine translation of JP 11139107, 1999.*
(Continued)

*Primary Examiner* — Justin Fischer
(74) *Attorney, Agent, or Firm* — Birch, Stewart, Kolasch & Birch, LLP (57) ABSTRACT

The collapse of conductive terminal rubber strips is prevented while a conductive terminal portion is formed stably to have an exposure width of 5 mm or less. The conductive terminal portion is formed by continuously winding the terminal strips formed of a conductive rubber toward an outward radial direction from a tread conductive layer to a tread ground contacting surface. The terminal strip is sequentially wound while shifting a position at a pitch D of a distance in a tire axial direction while the terminal strip goes around such that the conductive terminal portion constitutes a trapezoidal cross section in which a width (Wa) of an upper base is smaller than a width (Ws) of the terminal strip and a width (Wb) of a lower base is larger than the width (Ws) of the terminal strip. The width (Wa) of the upper base is within a range of between 2 mm and 5 mm.

4 Claims, 7 Drawing Sheets

(51) Int. Cl.
  *B29D 30/16* (2006.01)
  *B29D 30/30* (2006.01)
  *B29D 30/52* (2006.01)
  *B29D 30/60* (2006.01)
  *B29C 53/56* (2006.01)
  *B29K 21/00* (2006.01)
  *B29K 105/24* (2006.01)
  *B29K 105/00* (2006.01)
  *B29L 30/00* (2006.01)

(52) U.S. Cl.
  CPC .... *B29D 2030/526* (2013.01); *B29K 2021/00* (2013.01); *B29K 2105/246* (2013.01); *B29K 2105/253* (2013.01); *B29K 2995/0005* (2013.01); *B29K 2995/0094* (2013.01); *B29L 2030/002* (2013.01)

(58) Field of Classification Search
  CPC . B29D 2030/526; B60C 11/005; B60C 11/14; B60C 19/08; B60C 19/082
  See application file for complete search history.

(56) References Cited

U.S. PATENT DOCUMENTS

2009/0050257 A1    2/2009   Frerichs
2010/0006194 A1    1/2010   Asayama et al.

FOREIGN PATENT DOCUMENTS

| JP | 11139107 | * | 5/1999 |
| JP | 2000-108222 A | | 4/2000 |
| JP | 2001-191423 A | | 7/2001 |
| JP | 2006-137067 A | | 6/2006 |
| JP | 2008-013000 A | | 1/2008 |
| JP | 2010-222004 A | | 10/2010 |
| WO | WO 2007/097104 A | | 8/2007 |

OTHER PUBLICATIONS

International Search Report issued in PCT/JP2012/080312, mailed on Feb. 5, 2013.
Extended European Search Report, issued Dec. 7, 2015, for European Application No. 12866143.6.

* cited by examiner

PNEUMATIC TIRE AND METHOD FOR MANUFACTURING SAME

The present invention relates to a pneumatic tire in which a conductive terminal portion with a narrow exposed width is formed in a tread rubber by winding a laminate of a rubber strip, and to a method for producing the pneumatic tire.

BACKGROUND ART

To decrease rolling resistance of a tire so as to enhance low fuel consumption performance, it has been proposed that silica instead of carbon black is blended as a rubber reinforcing agent into the tread rubber. However, silica has poor conductivity. Therefore, in the tire using the tread rubber highly blended with silica, static electricity may accumulate in a vehicle, thus causing electromagnetic interference, such as radio noise.

Figure 7A:
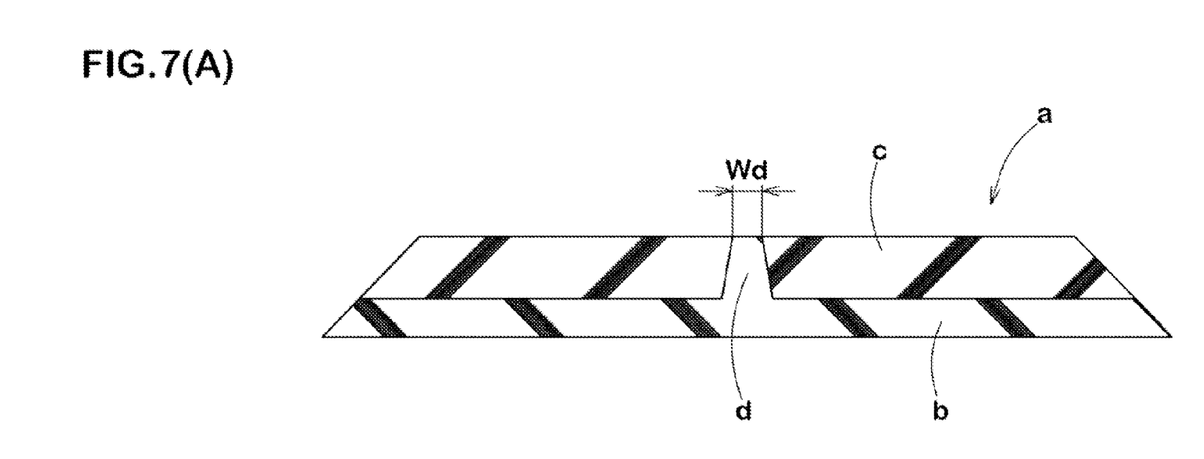
FIGS. 7(A) and 7(B) are respectively cross-sectional views showing a structure of a conventional tread rubber including a conductive terminal.

Hence, for example, a tread rubber (a) as shown in FIG. 7(A) has been proposed. The tread rubber (a) includes a base rubber portion (b) of conductive rubber highly blended with carbon, a cap rubber portion (c) of non-conductive rubber highly blended with silica, and a conductive terminal portion (d) of conductive rubber extending upward from the base rubber portion (b) through the cap rubber portion (c) to a tread ground contact surface. The tread rubber (a) can be formed by extrusion molding of rubber.

To suppress uneven wear that occurs between the conductive terminal portion (d) and the cap rubber portion (c), an exposed width (Wd) of the conductive terminal portion (d) is preferably decreased as much as possible. The exposed width (Wd) is, for example, not more than 5 mm. When the exposed width (Wd) is set to a small value in the extrusion molding, there is a probability that due to variations of a rubber flow in an extrusion head, the conductive terminal portion (d) is interrupted therein and fails to be in continuity. At this time, it is difficult to easily find the interruption of the conductive terminal portion (d), thus eventually requiring a continuity test of a total number of tires. This significantly lowers productivity.

Figure 7B:
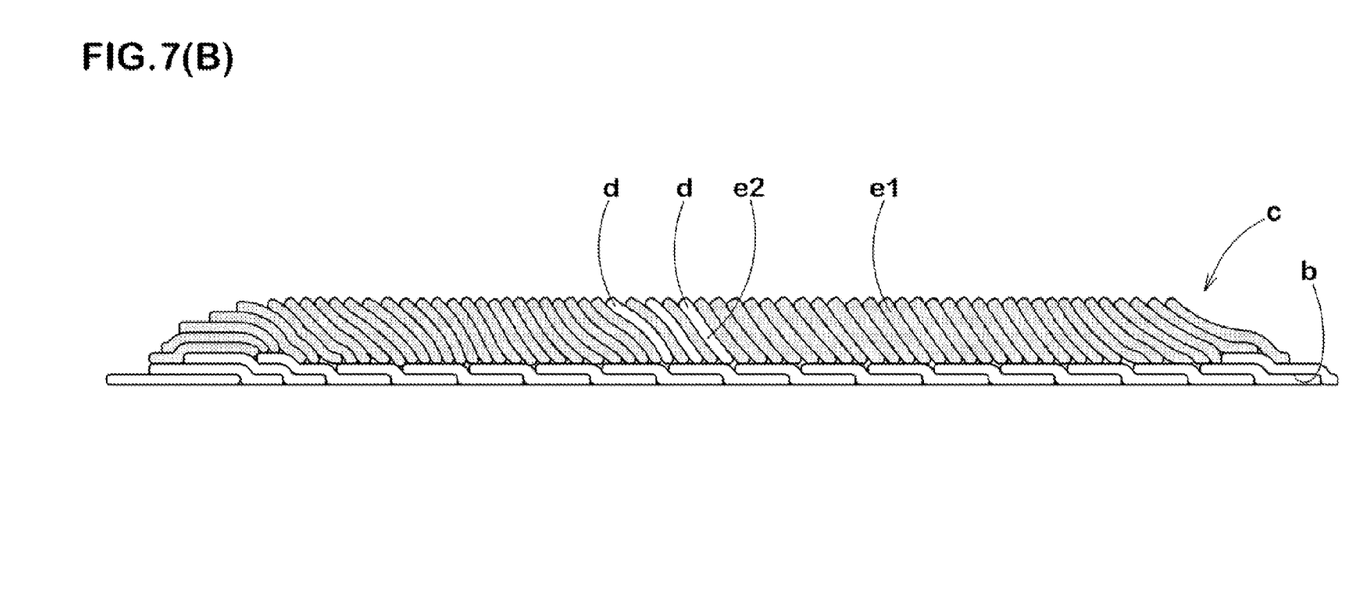

The following patent document 1 has proposed to form the cap rubber portion (c) and the conductive terminal portion (d) by using what is called a strip winding method including spirally winding the rubber strip instead of the extrusion molding, as shown in FIG. 7(B). The strip winding method has an advantage that the interruption of the conductive terminal portion (d) can be easily detected as a break of the rubber strip in the middle of winding.

This structure, however, requires the use of rubber strips (e1, e2) having a large width beyond a thickness of the cap rubber portion (c), thus making it difficult to form the tread rubber in a desired cross-sectional shape. Moreover, the rubber strips (e1, e2) have a posture corresponding to a steep slope. Therefore, when the rubber strip (e2) for the conductive terminal is bonded to a side surface (slope) of the rubber strip (e1) wound previously, the rubber strip (e2) is susceptible to misregistration along the slope, thus making it difficult to maintain highly accurate formation of the tread rubber.

It is therefore desired to form the conductive terminal portion (d) by continuously windingly laminating the rubber strip (e2) for the conductive terminal radially outward from the base rubber portion (b) to the tread ground contact surface.

Figure 8:
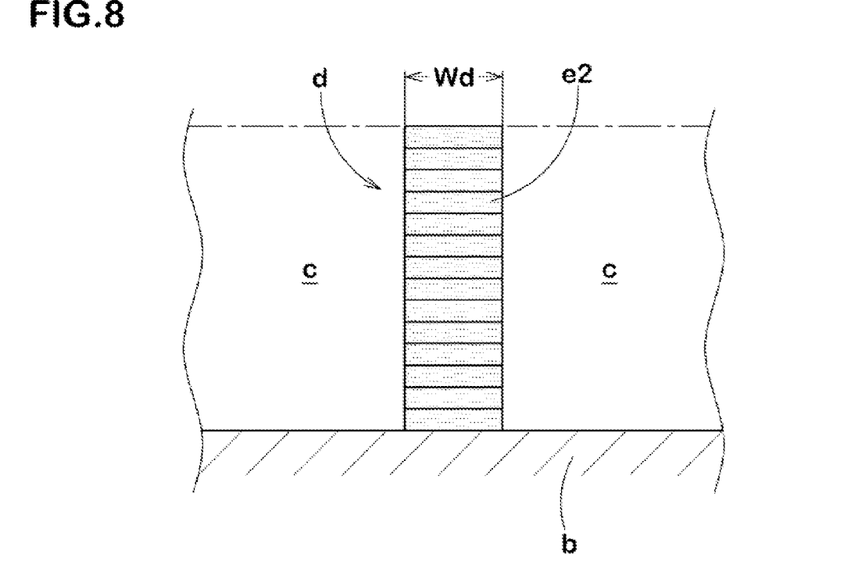
FIG. 8 is a cross-sectional view for explaining a problem encountered when forming the conductive terminal by windingly laminating a rubber strip.

However, when the conductive terminal portion (d) having the exposed width (Wd) of not more than 5 mm in the winding laminate structure, the width of the rubber strip (e2) also becomes narrow, as small as not more than 5 mm, as shown in FIG. 8. Therefore, a laminate collapse may occur when laminating the rubber strip (e2), thus failing to stably form the conductive terminal portion (d).

RELATED ART DOCUMENTS

Patent Document

Patent document 1: Japanese Unexamined Patent Application Publication No. 2006-137067.

DISCLOSURE OF THE INVENTION

Problem to be Solved by the Invention

It is an object of the present invention to provide a pneumatic tire that ensures a stable formation of a conductive terminal portion whose exposed width is not more than 5 mm, while preventing the laminate collapse of the rubber strip for the conductive terminal, and also provide a method for producing the pneumatic tire.

To solve the above-mentioned problem, according to claim 1 of the present invention, a pneumatic tire comprises a tread portion. The tread portion comprises a tread conductive layer that is conductive to be in continuity with a rim during assembly of the rim, and a tread rubber disposed radially outside the tread conductive layer and having an outer peripheral surface constituting a tread ground contact surface. The tread rubber comprises an annular conductive terminal portion disposed in a tread central region, and a tread rubber body disposed on opposite outsides of the conductive terminal portion in an axial direction of the tire, the conductive terminal portion extending upward from the tread conductive layer through the tread rubber to the tread ground contact surface and extending continuously in a circumferential direction of the tire. The conductive terminal portion is formed by allowing a terminal strip made of conductive rubber to be continuously windingly laminated radially outward from the tread conductive layer to the tread ground contact surface. The terminal strip is sequentially windingly laminated while being subjected to misregistration with a pitch of a distance D in the axial direction of the tire during time that the terminal strip is wound one time, so as to allow the conductive terminal portion to have a trapezoid-shaped cross section in which a width Wa of an upper base is smaller than a width Ws of the terminal strip and a width Wb of a lower base is larger than the width Ws of the terminal strip. And The width Wa of the upper base is in a range of 2 to 5 mm.

According to claim 4 of the present invention relates to a method for producing a pneumatic tire comprising a tread portion comprises, the tread portion comprising a tread conductive layer that is conductive to be in continuity with a rim during assembly of the rim, and a tread rubber disposed radially outside the tread conductive layer and having an outer peripheral surface constituting a tread ground contact surface, the tread rubber comprising an annular conductive terminal portion that is disposed in a tread central region, extends upward from the tread conductive layer through the tread rubber to the tread ground contact surface, and extends continuously in a circumferential direction of the tire. The method comprising a green tire formation process comprising a winding laminate step of forming the conductive terminal portion by continuously windingly laminating a terminal strip made of conductive rubber radially outward from the tread conductive layer to the tread ground contact surface. The winding laminate step comprises sequentially windingly laminating the terminal strip while causing misregistration with a pitch of a distance D in an axial direction of the tire during time that the terminal strip is wound one time, so as to allow the conductive terminal portion to have a trapezoid-shaped cross section in which a width Wa of an upper base is smaller than a width Ws of the terminal strip and a width Wb of a lower base is larger than the width Ws of the terminal strip. And the width Wa of the upper base is in a range of 2 to 5 mm.

According to claims 2 and 5, the conductive terminal portion has the trapezoid-shaped cross section whose one side has a base angle θ of not less than 30°.

According to claims 3 and 6, the width Ws of the terminal strip is larger than a length of an oblique side of another side of the trapezoid-shaped cross section.

In the present description, the term "conductive rubber" denotes rubber having a volume specific resistance of less than $1 \times 10^8$ Ωcm, and the term "non-conductive rubber" denotes rubber having a volume specific resistance of not less than $1 \times 10^8$ Ωcm. The volume specific resistance value is to be a value obtained by making measurement using samples of 15 cm square rubber with a thickness of 2 mm and using an electric resistance measuring instrument, ADVANTESTER8340A, under conditions, such as an applied voltage of 500V, temperature of 25° C., and humidity of 50%.

Effects of the Invention

According to the present invention, the conductive terminal portion is formed by continuously windingly laminating the terminal strip radially outward from the tread conductive layer to the tread ground contact surface. At this time, the misregistration is caused with a pitch of the distance D in an axial direction of the tire during the time that the terminal strip is wound one time. Thereby, the conductive terminal portion is defined by the trapezoid-shaped cross section in which the width Wa of the upper base is smaller than the width Ws of the terminal strip and the width Wb of the lower base is larger than the width Ws of the terminal strip.

The winding laminate structure permits use of the terminal strip having a larger width than the width Wa of the upper base. Additionally, the width of the lower base of the conductive terminal portion gradually increases as height increases with the progress of winding laminate. Therefore, even when the width of the upper base of the conductive terminal portion is restricted to not more than 5 mm, the conductive terminal portion can be formed stably and accurately without causing the laminate collapse of the terminal strip.

MODE FOR CARRYING OUT THE INVENTION

An embodiment of the present invention is described in detail below.

Figure 1:
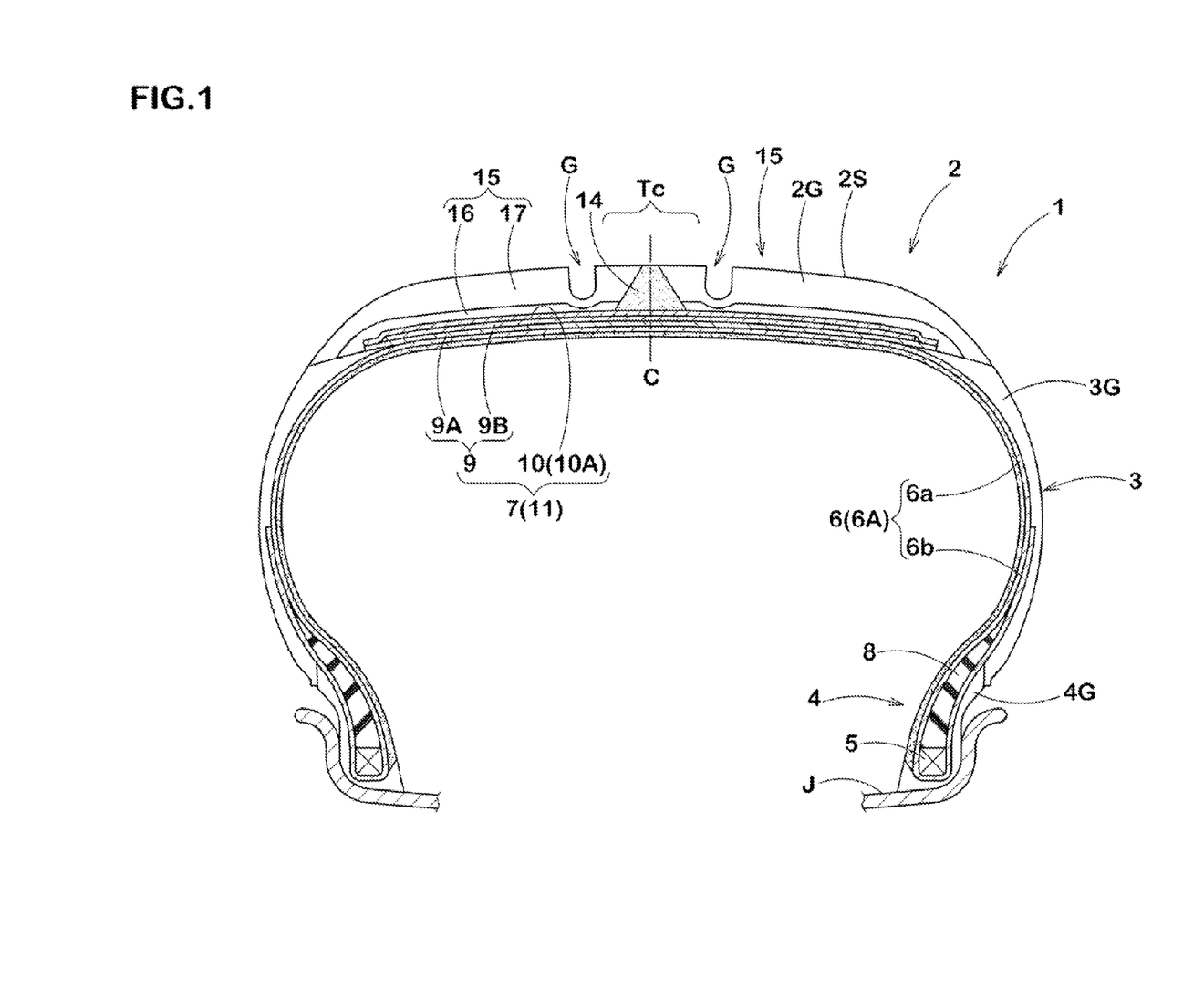
FIG. 1 is a cross-sectional view showing an embodiment of a pneumatic tire produced by a production method of the present invention.

Referring to FIG. 1, a pneumatic tire 1 of the present embodiment includes a toroidal carcass 6 extending from a tread portion 2 through a sidewall portion 3 to a bead core 5 of a bead portion 4, and a tread reinforcing cord layer 7 disposed outside the carcass 6 in a radial direction of the tire and in the interior of the tread portion 2.

The carcass 6 includes a toroidal carcass body portion 6a extending between the bead cores 5 and 5, and carcass turn-up portions 6b respectively disposed at both ends of the carcass body portion 6a, which are respectively folded outwardly around the bead cores 5 from inside to outside in the axial direction of the tire. The carcass 6 is made up of one or more carcass plies 6A, namely, the single carcass ply in the present embodiment. The carcass ply 6A is one obtained by coating, with topping rubber, an array body of carcass cords arranged at an angle of, for example, 70 to 90° with respect to a circumferential direction of the tire. A bead apex rubber 8 for reinforcing the bead, which extends in a tapered shape radially outward from the bead core 5, is disposed between the carcass body portion 6a and the carcass turn-up portions 6b.

The tread reinforcing cord layer 7 is made up of a belt layer 9 or a band layer 10. The present embodiment illustrates the case where the tread reinforcing cord layer 7 is made up of the belt layer 9 overlappedly disposed on the carcass 6, and the band layer 10 overlappedly disposed outside the belt layer 9.

The belt layer 9 includes two or more belt plies 9A and 9B, namely, the two belt plies in the present embodiment. The belt plies 9A and 9B are respectively ones obtained by coating, with topping rubber, an array body of belt cords arranged at an angle of, for example, 15 to 40° with respect to the circumferential direction of the tire. In the belt layer 9, the belt cords intersect one another between the plies so as to enhance rigidity of the belt, thereby strongly reinforcing approximately the full width of the tread portion 2.

The band layer 10 is made of a band ply 10A obtained by coating a band cord with topping rubber. The band cord is spirally wound at an angle of not more than 5° with respect to the circumferential direction of the tire. Consequently, the band layer 10 constrains the belt layer 9 so as to improve steering stability and high speed durability. Examples of the band ply 10A include a pair of right and left edge band plies that coat only outer end portions of the belt layer 9 in the axial direction of the tire, and a full band ply that covers approximately the full width of the belt layer 9. These individual plies are used singly or in combination as the band ply 10A. The present embodiment illustrates one in which the band layer 10 is made up of the single full band ply. The tread reinforcing cord layer 7 can be formed only of the belt layer 9 or only of the band layer 10. The belt cord and the band cord may be generally referred to as "tread reinforcing cord." The belt plies 9A and 9B and the band ply 10A may be generally referred to as "tread reinforcing ply."

A sidewall rubber 3G, which constitutes a tire outer skin of the sidewall portion 3, is disposed outside the carcass 6 in the axial direction of the tire. A clinch rubber 4G is disposed on the bead portion 4. The clinch rubber 4G constitutes the tire outer skin, and an outer end portion of the clinch rubber 4G in a radial direction of the tire is connected to the sidewall rubber 3G. An inner end portion of the clinch rubber 4G in the radial direction of the tire is contacted with a rim J. In the present embodiment, these rubbers 3G and 4G, the topping rubber of the carcass ply 6A, and the topping rubber of the tread reinforcing ply are made of conductive rubber. Similarly to conventional general tires, the conductive rubber has a volume specific electric resistance value of less than $1.0 \times 10^8$ ($\Omega \cdot cm$) by highly blending carbon black as a rubber reinforcing agent. Accordingly to the present embodiment, it is ensured that the tread reinforcing cord layer 7 is in continuity with the rim J during assembly of the rim. The tread reinforcing cord layer 7 constitutes a tread conductive layer 11 that is conductive.

A tread rubber 2G, whose outer peripheral surface constitutes a tread ground contact surface 2S, is disposed radially outside the tread conductive layer 11.

The tread rubber 2G includes a conductive terminal portion 14 disposed in a tread central region Tc, and a tread rubber body 15 disposed on opposite outsides of the conductive terminal portion 14 in the axial direction of the tire. The conductive terminal portion 14 extends upward from the tread conductive layer 11 through the tread rubber 2G to the tread ground contact surface 2S. The conductive terminal portion 14 has an annular shape continuously extending in the circumferential direction of the tire.

The tread rubber body 15 of the present embodiment is made up of a base rubber portion 16, and a cap rubber portion 17 overlappedly disposed radially outside the base rubber portion 16. The base rubber portion 16 is overlappedly disposed radially outside the tread conductive layer 11. An outer peripheral surface of the cap rubber portion 17 constitutes the tread ground contact surface 2S. The base rubber portion 16 and the cap rubber portion 17 of the present embodiment are non-conductive rubber having a volume specific electric resistance value of not less than $1.0 \times 10^8$ ($\Omega \cdot cm$). The base rubber portion 16 and the cap rubber portion 17 are highly blended with silica as a rubber reinforcing agent.

Figure 3:
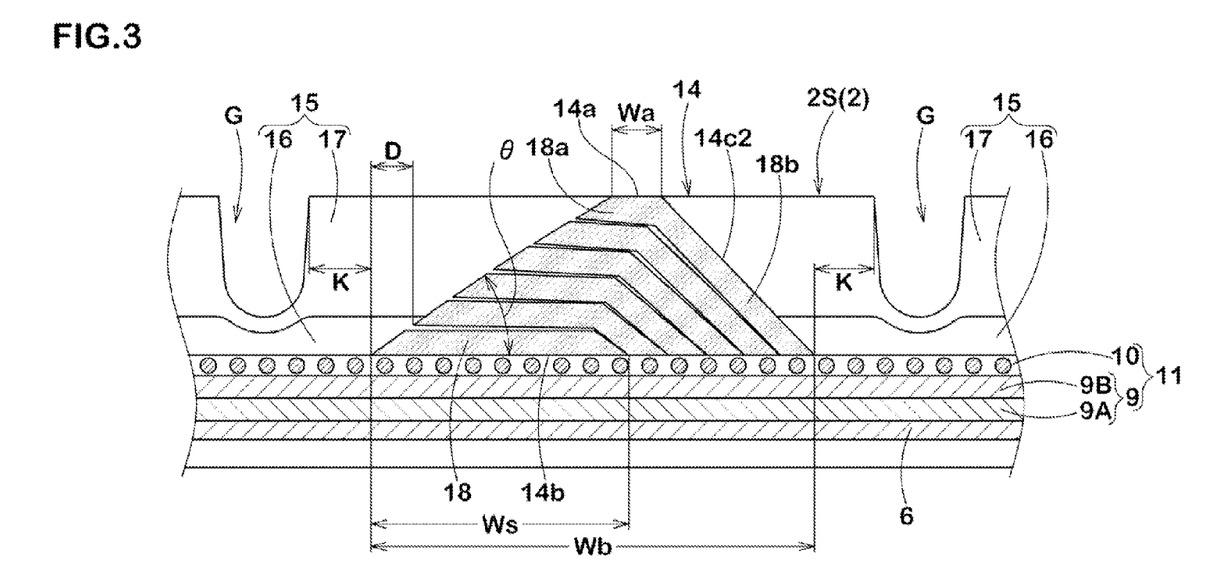
FIG. 3 is a cross-sectional view showing in enlarged dimension a conductive terminal portion.

As shown in enlarged dimension in FIG. 3, the conductive terminal portion 14 is formed by continuously windingly laminating the terminal strip 18 radially outward from the tread conductive layer 11 to the tread ground contact surface 2S. The terminal strip 18 is made of conductive rubber.

At this time, the terminal strip 18 is sequentially windingly laminated while being subjected to misregistration with a pitch of a distance D in the axial direction of the tire during the time that the terminal strip 18 is wound one time. A width Wa of an upper base 14a of the conductive terminal portion 14 is smaller than a width Ws of the terminal strip 18. A width Wb of a lower base 14b of the conductive terminal portion 14 is larger than the width Ws of the terminal strip 18. Accordingly, the conductive terminal portion 14 is defined by a trapezoid-shaped cross section. The trapezoid-shaped cross section includes a laminated portion 18a, and a winding-down portion 18b to be wound down from the laminated portion 18a along a trapezoid-shaped oblique side 14c2. The laminated portion 18a is formed by sequentially laminating second and subsequent terminal strips 18 on the upper surface of the firstly wound terminal strip 18. The winding-down portion 18b is wound down to a height position of the lower base 14b.

Figure 4:
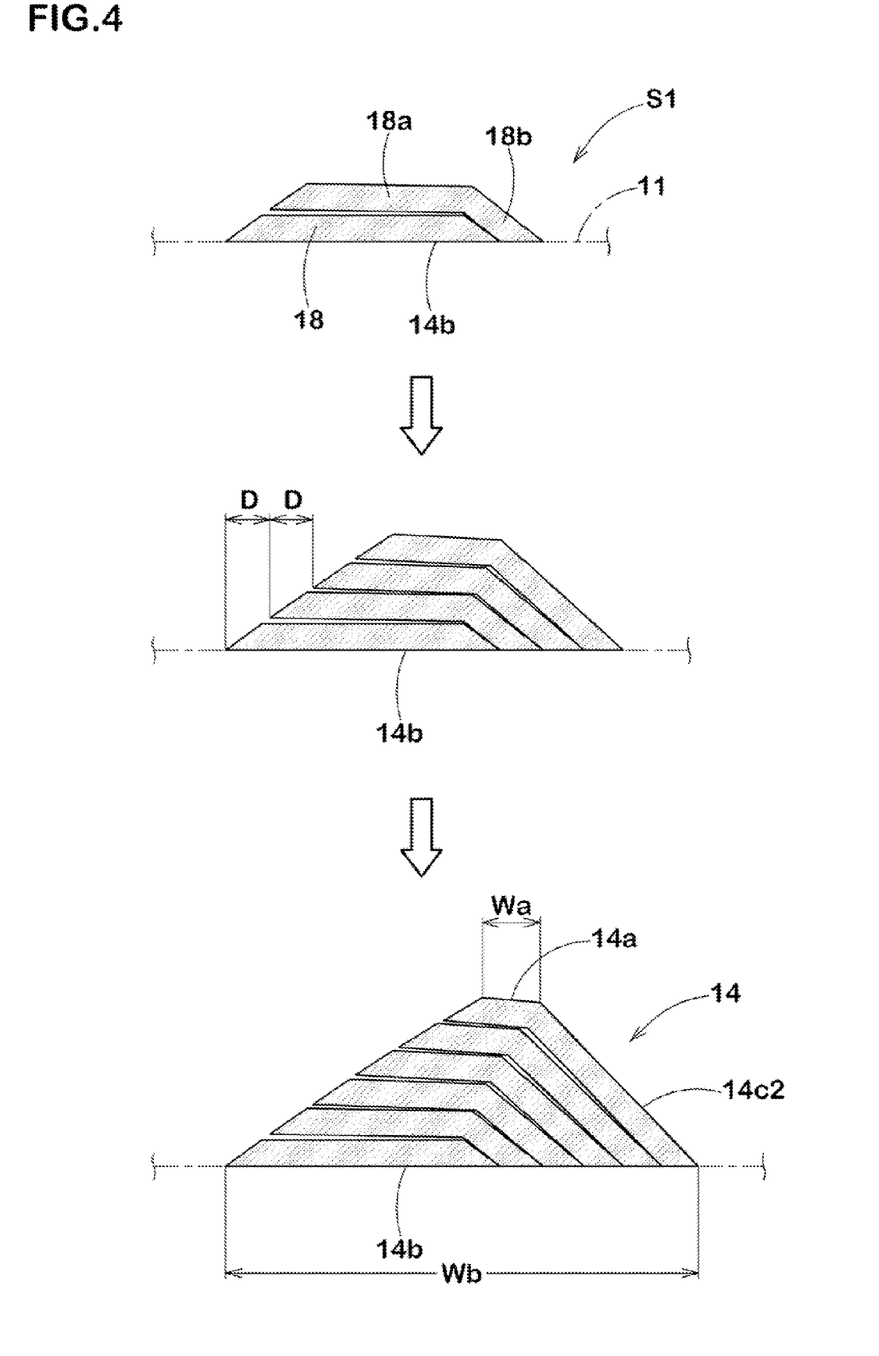
FIG. 4 is an explanatory drawing showing a method for winding the terminal strip.

The winding laminate structure permits use of the terminal strip 18 having a larger width than the width Wa of the upper base 14a. Additionally, as shown in FIG. 4, the width of the lower base 14b gradually increases as height increases with the progress of winding laminate. Therefore, even when the width of the upper base 14a of the conductive terminal portion 14 is restricted to not more than 5 mm, the conductive terminal portion 14 can be formed accurately and stably without causing a winding collapse of the terminal strip 18.

Here, the width Wa of the upper base 14a is in the range of 2 to 5 mm. When the width Wa of the upper base 14a exceeds 5 mm, a contact area between the conductive terminal portion 14 and a road surface becomes excessively large, thus adversely affecting grip performance and uneven wear. When the width Wa of the upper base 14a is less than 2 mm, electrical resistance between the conductive terminal portion 14 and the road surface increases, making it difficult to discharge static electricity of a vehicle side to the road surface.

In FIGS. 3 and 4, a gap between the terminal strips 18 adjacent to each other is plotted to clarify a winding state of the terminal strips 18. Actually, the terminal strips 18 are in close contact with each other.

A base angle θ of one side in the trapezoid-shaped cross section of the conductive terminal portion 14 is preferably not less than 30°. When the base angle θ is less than 30°, the width Wb of the lower base 14b is accordingly increased. Consequently, a rubber volume of the conductive terminal portion 14 may increase, resulting in deterioration of the rolling resistance of the tire. The base angle θ of 30° can be set by the following equation (1).

$$\theta = \tan^{-1}(Ts/D) \qquad (1),$$

wherein Ts is a thickness of the terminal strip 18.

When the base angle θ is too large, the winding-down portion 18b of the terminal strip 18 cannot be wound down to a height position of the lower base 14b, thus failing to form the trapezoid-shaped cross section. Therefore, an upper limit of the base angle θ is allowable up to a maximum value that permits formation of the trapezoid-shaped cross section. To form the trapezoid-shaped cross section, the width Ws of the terminal strip 18 is larger than a length of the oblique side 14c2.

Figure 2:
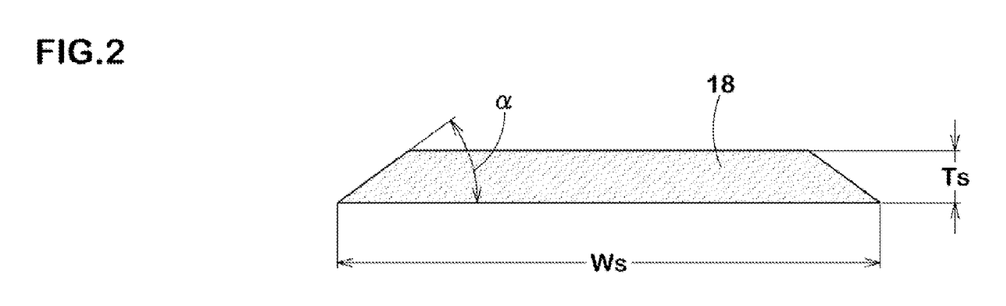
FIG. 2 is a cross-sectional view showing a terminal strip.

The surface of the conductive terminal portion 14 is preferably formed smoothly. Hence, the terminal strip 18 preferably has a trapezoid-shaped cross section in which both end portions in a width direction of the terminal strip 18 are respectively slopes as shown in FIG. 2. To approximate to the base angle θ, an angle α of the slopes of the terminal strip 18 is preferably determined in a range of θ±15°. Alternatively, the terminal strip 18 may suitably have a rectangle-shaped cross section, a parallelogram-shaped cross section, or the like. No specific limitation is imposed on the width Ws and the thickness Ts of the terminal strip 18, and both may be suitably set according to a tire size or the like. In the present embodiment, the width Ws is 23 mm, and the thickness Ts is 1 mm.

The conductive terminal portion 14, which is made of conductive rubber, is apt to have poor adhesion to the tread rubber body 15 composed of the non-conductive rubber. Hence, there is a risk of peel damage with an interface therebetween as the starting point. However, with the present embodiment, the conductive terminal portion 14 has the trapezoid-shaped cross section so as to ensure a large contact area with the tread rubber body 15 and also contribute to suppression of the peel damage. The tread portion 2 usually includes a plurality of circumferential grooves G for draining that extend in the circumferential direction of the tire. These circumferential grooves G are preferably disposed on both sides of the conductive terminal portion 14 at a distance K (shown in FIG. 3). This reduces the influence of bending deformation that occurs at groove bottoms of the circumferential grooves G, thereby further suppressing the peel damage.

The tread central region Tc exerts less influence on rolling resistance and high speed traveling performance than a tread shoulder region located outside the tread central region Tc in the axial direction of the tire. Therefore, the conductive terminal portion 14 can be formed in the tread central region Tc so as to minimize disadvantages to the rolling resistance and the high speed traveling performance. The term "tread central region Tc" denotes a region with a width of 50% of the tread ground contact width around a tire equator C. The present embodiment illustrates a preferable case of forming the conductive terminal portion 14 on the tire equator C.

A method for producing the pneumatic tire 1 is described below. As shown in FIG. 4, a green tire forming process in the production method includes a winding laminate step S1 of forming the conductive terminal portion 14. The conductive terminal portion 14 is formed by continuously windingly laminating the terminal strip 18 radially outward from the tread conductive layer 11 to the tread ground contact surface 2S.

In the winding laminate step S1, the terminal strip 18 is sequentially windingly laminated while being subjected to misregistration with the pitch of the distance D in the axial direction of the tire during the time that the terminal strip 18 is wound one time. Consequently, the width Wa of the upper base 14a of the conductive terminal portion 14 is smaller than the width Ws of the terminal strip 18. The width Wb of the lower base 14b of the conductive terminal portion 14 is larger than the width Ws of the terminal strip 18. Accordingly, the conductive terminal portion 14 has the trapezoid-shaped cross section.

Figure 5:
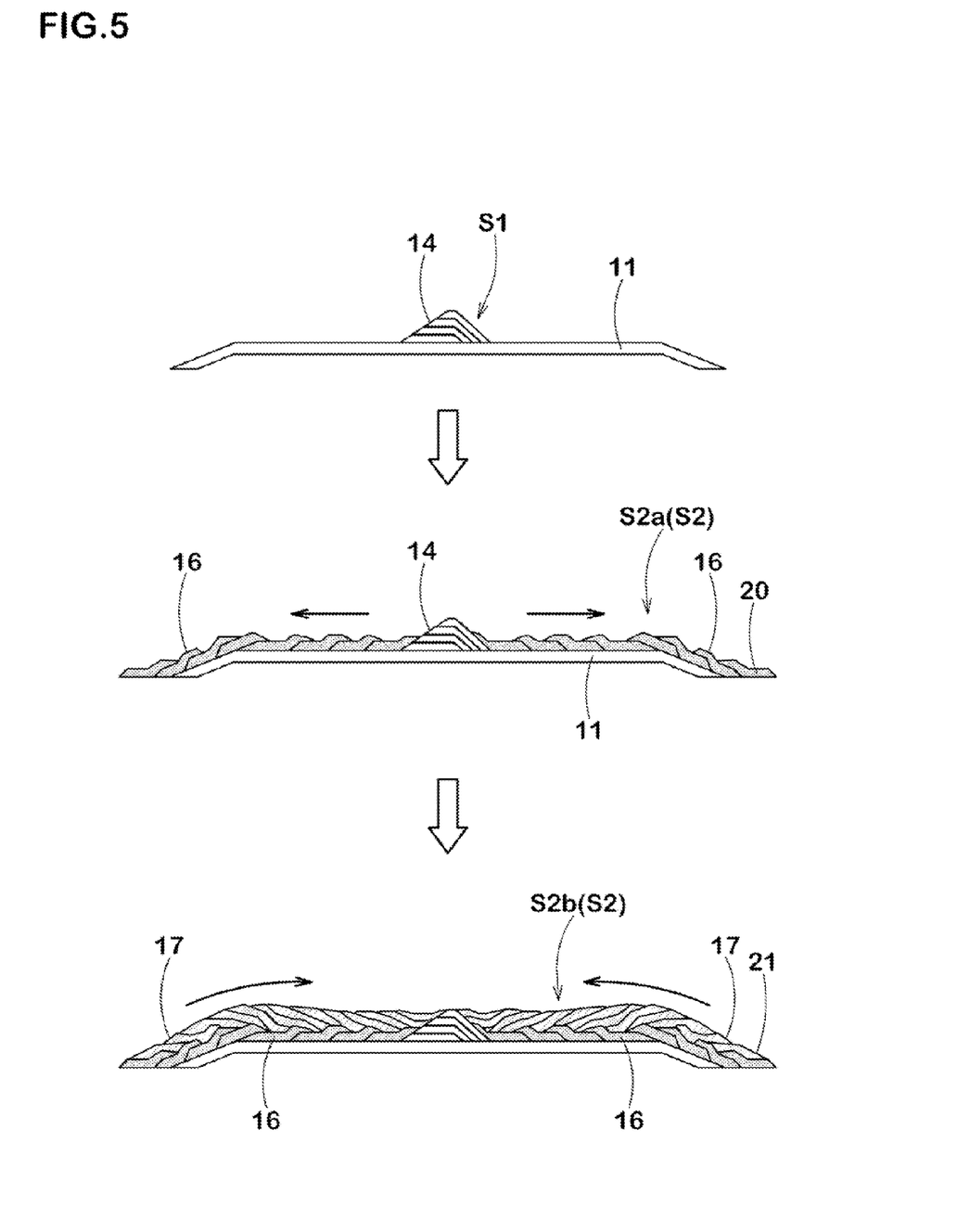
FIG. 5 is an explanatory drawing showing a method for forming a base rubber portion and a cap rubber portion.

After the winding laminate step S1, a tread rubber body formation step S2 is carried out. As shown in FIG. 5, the tread rubber body formation step S2 includes a base rubber formation stage S2a, and a cap rubber formation stage S2b. In the base rubber formation stage S2a, the base rubber portion 16 is formed on the tread conductive layer 11 and at the opposite outsides of the conductive terminal portion 14. The base rubber portion 16 is formed by spirally winding the base rubber strip 20. In the present embodiment, the base rubber strip 20 is wound from inside to outside in the axial direction of the tire.

In the cap rubber formation stage S2b, the cap rubber portion 17 is formed on the base rubber portion 16 and at the opposite outsides of the conductive terminal portion 14. The cap rubber portion 17 is formed by spirally winding the cap rubber strip 21. In the present embodiment, the cap rubber strip 21 is wound from outside to inside in the axial direction of the tire. The base rubber formation stage S2a and the cap rubber formation stage S2b differ from each other in the winding direction of their respective strips 20 and 21 so as to obtain the effect of suppressing peel damage between the base rubber portion 16 and the cap rubber portion 17.

A lateral force is applied to the tread ground contact surface 2S toward the outside in the axial direction of the tire during turning. Hence, the cap rubber strip 21 is wound from the outside to the inside in the axial direction of the tire. Consequently, the lateral force acts in an extending direction of an interface between the cap rubber strips 21 and 21. It is therefore ensured to obtain the effect of suppressing the peel damage to the interface.

Figure 6A:
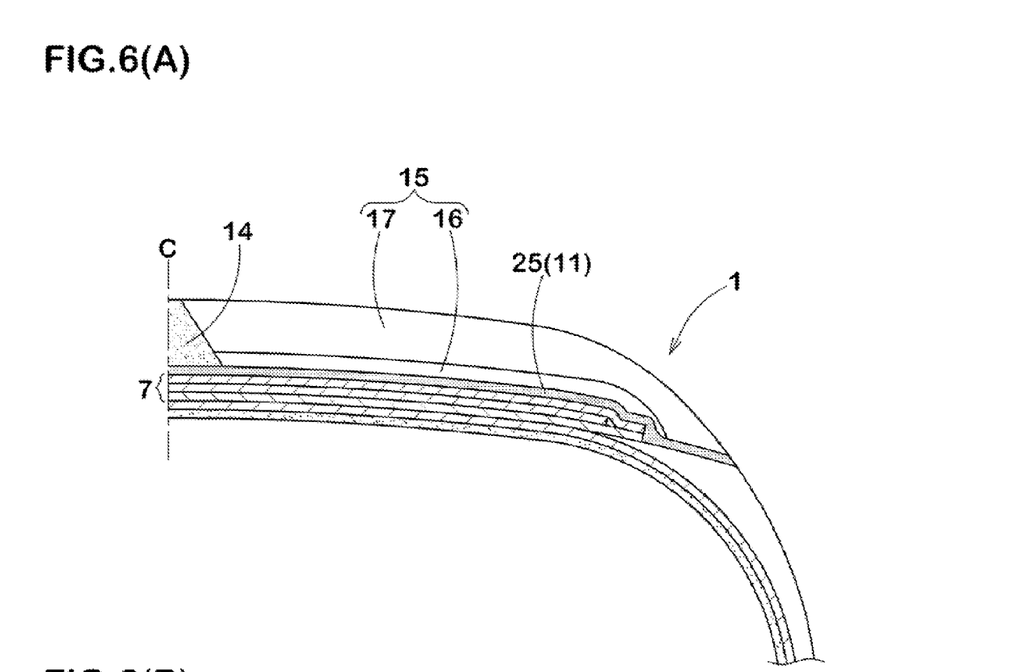
FIGS. 6(A) and 6(B) are respectively partial cross-sectional views showing other embodiments of the pneumatic tire.
Figure 6B:
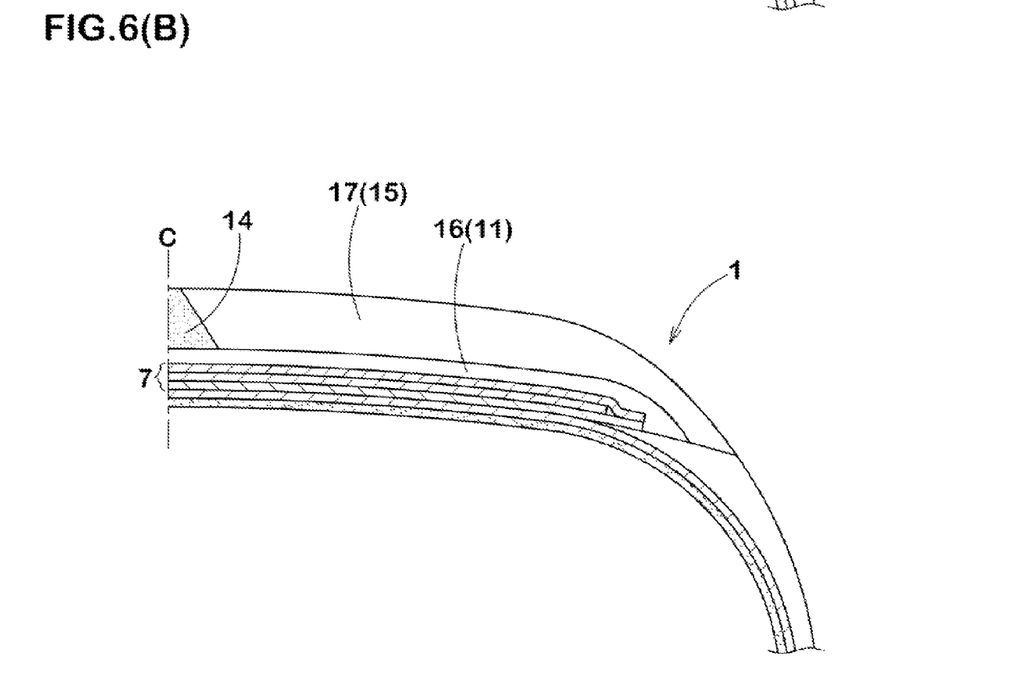

FIGS. 6(A) and 6(B) respectively illustrate other embodiments of the pneumatic tire 1 of the present invention. In the pneumatic tire 1 of FIG. 6(A), a base rubber layer 25 made of conductive rubber is disposed outside the tread reinforcing cord layer 7. According to this embodiment, the base rubber layer 25 constitutes the tread conductive layer 11. In the pneumatic tire 1 of FIG. 6(B), the base rubber portion 16 is formed of conductive rubber. The base rubber portion 16 is formed as a wide rubber layer that extends below the conductive terminal portion 14 and is continuous at both sides in the axial direction of the tire. According to this embodiment, the base rubber portion 16 constitutes the tread conductive layer 11. The cap rubber portion 17 constitutes the tread rubber body 15.

Although the particularly preferred embodiments of the present invention have been described in detail, the present invention can be modified and carried out in various embodiments without being limited to the illustrated embodiments.

EXAMPLES

Using the method for producing a tire according to the present application, radial tires for a passenger car (225/50R17) having an internal structure shown in FIG. 1 were produced by way of trial based on the specification shown in Table 1. Comparisons were made in terms of uneven wear characteristics of the trial tires and problems encountered when forming green tires. The specification of the individual tires was substantially the same except for the specification shown in Table 1. The tread body portion was made using conductive rubber highly blended with silica. The conductive terminal portion was made using conductive rubber highly blended with carbon black.

(1) Problems Encountered when Forming Green Tires

Occurrence situations of the problems encountered when forming 100 green tires were confirmed.

(2) Uneven Wear Characteristics

The trial tires were traveled on a test drum having a surface similar to a dry paved road under conditions, such as a rim (17×7 J), an internal pressure (200 kPa), and a vertical load (6.6 kN). The presence or absence of the occurrence of uneven wear in the conductive terminal after a travel of 10000 km was evaluated by inspectors' visual observation.

(3) Rolling Resistance

The rolling resistance at a speed of 80 km/h was measured using a rolling resistance testing machine under conditions, such as the rim (17×7 J), internal pressure (200 kPa), and vertical load (6.6 kN). Evaluations were made by an index, with Example 1 being 100. A smaller value indicates lower rolling resistance that is suitable.

(4) Tire Electrical Resistance

Figure 9:
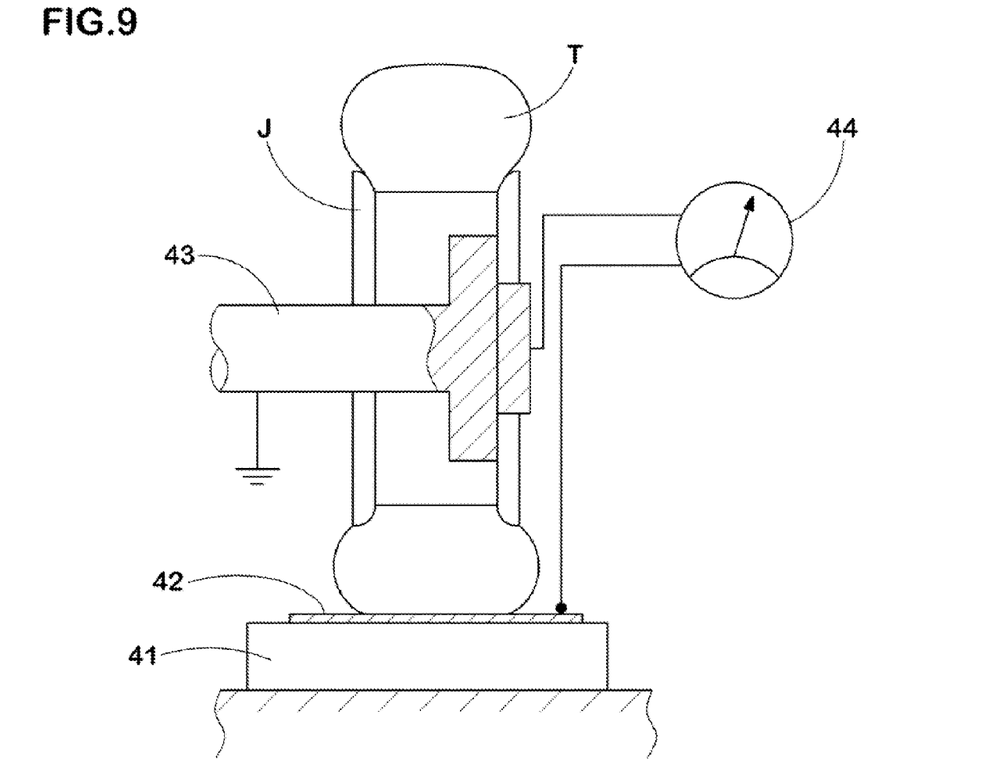
FIG. 9 is an explanatory drawing showing an apparatus for measuring electric resistance of a tire.

As shown in FIG. 9, an electrical resistance value of an assembly of the tire and the rim was measured according to JATMA regulations by using a measuring apparatus including an insulating plate 41 (having an electrical resistance value of not less than $10^{12}\Omega$), a conductive metal plate 42 (having an electrical resistance value of more than $10\Omega$) disposed on the insulating plate 41, a conductive tire mounting shaft 43 to hold the tire/rim assembly T, and an electrical resistance measuring instrument 44. Measuring conditions were as follows.

Rim Material: aluminum alloy
Rim Size:
Internal Pressure: 200 kPa
Load: 5.3 kN
Test Environment Temperature (Testing Room Temperature): 25° C.
Humidity: 50%
Measuring Range of Electric Resistance Measuring Instrument: $10^3$ to $1.6 \times 10^{16}\Omega$
Testing voltage (Applied voltage): 1000 V

TABLE 1

| Conductive Terminal Portion | Comp. Example 1 | Comp. Example 2 | Example 1 | Example 2 | Comp. Example 3 | Example 3 | Example 4 |
|---|---|---|---|---|---|---|---|
| Cross-sectional Shape | Rectangle | Trapezoid | | | | | |
| Width Wa (mm) | 5 | 1 | 2 | 5 | 7 | 5 | 5 |
| Width Wb (mm) | 5 | 26 | 27 | 30 | 32 | 41.3 | 62.6 |
| Base angle θ (degrees) | 90 | 40 | 40 | 40 | 40 | 30 | 20 |
| Strip Width Ws (mm) | 5 | | | | 23 | | |
| Strip Thickness Ts (mm) | 1 | | | | 1 | | |
| Problem when Forming Green Tires | *1 | None | None | None | None | None | None |
| Uneven Wear | — | None | None | None | Present | None | None |
| Rolling Resistance | — | 100 | 100 | 99 | 98.5 | 97 | 94 |
| Tire Electrical Resistance (Ω) | — | $1 \times 10^9$ | $0.1 \times 10^8$ | $0.1 \times 10^8$ | $0.1 \times 10^8$ | $0.1 \times 10^8$ | $0.1 \times 10^8$ |

*1 The terminal strip was subjected to winding collapse, failing to form the conductive terminal portion.

In each of Examples, the width of the conductive terminal portion can be set to not more than 5 mm while preventing the laminate collapse of the rubber strip, and the suppression of uneven wear of the tread portion can be confirmed.

DESCRIPTION OF THE REFERENCE NUMERAL

1 Pneumatic tire
2 Tread portion
2G Tread rubber
2S Tread ground contact surface
11 Tread conductive layer
14 Conductive terminal portion
14a upper base
14b Lower base
14c2 Oblique side
15 Tread rubber body
18 Terminal strip
J Rim
S1 winding laminate step
Tc Tread central region

What is claimed is:

1. A method for producing a pneumatic tire comprising a tread portion, the tread portion comprising a tread conductive layer that is conductive to be in continuity with a rim during assembly of the rim, and a tread rubber disposed radially outside the tread conductive layer and having an outer peripheral surface constituting a tread ground contact surface, the tread rubber comprising an annular conductive terminal portion that is disposed in a tread central region, extends upward from the tread conductive layer through the tread rubber to the tread ground contact surface, and extends continuously in a circumferential direction of the tire, the method comprising a green tire formation process comprising a winding laminate step of forming the conductive terminal portion by continuously windingly laminating a terminal strip made of conductive rubber radially outward from the tread conductive layer to the tread ground contact surface, wherein the winding laminate step comprises sequentially windingly laminating the terminal strip while causing misregistration with a pitch of a distance D in an axial direction of the tire during time that the terminal strip is wound one time, so as to allow the conductive terminal portion to have a trapezoid-shaped cross section in which a width Wa of an upper base is smaller than a width Ws of the terminal strip and a width Wb of a lower base is larger than the width Ws of the terminal strip, and wherein the width Wa of the upper base is in a range of 2 to 5 mm.

2. The method for producing a pneumatic tire according to claim 1, wherein the conductive terminal portion has the trapezoid-shaped cross section whose one side has a base angle θ of not less than 30°.

3. The method for producing a pneumatic tire according to claim 2, wherein the width Ws of the terminal strip is larger than a length of an oblique side of another side of the trapezoid-shaped cross section.

4. The method for producing a pneumatic tire according to claim 1, wherein the width Ws of the terminal strip is larger than a length of an oblique side of another side of the trapezoid-shaped cross section.

* * * * *